United States Patent [19]

Munroe

[11] 4,279,568
[45] Jul. 21, 1981

[54] VANE ANGLE CONTROL
[75] Inventor: Alan D. Munroe, Glastonbury, Conn.
[73] Assignee: United Technologies Corporation, Hartford, Conn.
[21] Appl. No.: 951,894
[22] Filed: Oct. 16, 1978
[51] Int. Cl.³ .............. F01D 17/20; F02C 7/057
[52] U.S. Cl. .................................. 415/17; 415/33; 60/39.29
[58] Field of Search ............... 60/39.29; 415/17, 160, 415/162, 33

[56] References Cited
U.S. PATENT DOCUMENTS

| | | | |
|---|---|---|---|
| 2,705,590 | 4/1955 | Lovesey et al. | 60/39.29 |
| 2,931,168 | 4/1960 | Alexander et al. | 60/39.29 |
| 2,933,234 | 4/1960 | Neumann | 415/149 |
| 2,999,630 | 9/1961 | Warren et al. | 415/149 |
| 3,083,892 | 4/1963 | Carey et al. | 415/17 |
| 3,977,300 | 8/1976 | Sherman | 91/382 |

Primary Examiner—Louis J. Casaregola
Attorney, Agent, or Firm—Norman Friedland

[57] ABSTRACT

A linkage system for the variable stator vanes of a gas turbine engine is augmented by control means operable as a function of compressor speed designed to match the aerodynamic requirements of the airflow through the compressor so as to define the rate of schedule change of the vanes over its angular movement by compensating for the inadequacies inherent in the capabilities of the linkage system.

2 Claims, 3 Drawing Figures

VANE ANGLE CONTROL

BACKGROUND OF THE INVENTION

This invention relates to gas turbine engines and particularly to the variable stator vanes of its compressor.

Typically, the power plant includes a row of stator vanes ahead of each row of compressor blades to direct the air into the compressor at an optimum angle of attack. In the more sophisticated engines the vane angles vary over the engines operating envelope in an attempt to optimize performance for both design and off-design conditions. With the advent of the higher pressure ratios the controls for scheduling the stator blade angle has become more demanding. Ideally, it is desirable to design the vane schedule so they are flutter free and have better stall margins.

As is well known the angle of attack and aerodynamic characteristics vary from stage to stage of the compressor and that the rate of change of vane angle must be different for each row of vanes. Such systems achieving this feat are exemplified in U.S. Pat. Nos. 2,933,234 and 2,999,630 granted to R. E. Warren, L. V. C. Jensen, G. Neumann, and F. E. Nagel on Sept. 12, 1961 and to G. Neumann on Apr. 19, 1960, respectively. In each of these systems however, the vane actuator stroke versus vane stagger angle are linear yet this results in a nonlinear curve of stroke versus speed and within the confines of the linkage design they are unable to suitably match the stroke versus speed schedule.

I have found that I can achieve a close matched schedule that goes beyond the capabilities of a bell crank and linkage system or similar ones as for example four bar linkage system by selectively adjusting the stroke versus speed characteristics as a function of speed of the compressor. This system requires that the linkage system be first designed such that the vane angle for both the maximum and minimum stroke position is accurate. The vane angle versus stroke position is then plotted for this linkage by using a linear speed/stroke relationship. Then, for a given stroke and vane angle position the correct engine speed is assigned thereby generating an optimum nonlinear speed/stroke relationship for this selected linkage.

SUMMARY OF THE INVENTION

A feature of this invention is to match a predetermined stroke/speed relationship of rows of stator vanes for the compressor of a gas turbine engine by scheduling the angular movement of said vanes as a function of compressor speed.

Another feature is the method of closely matching the variable vane schedule by performing the following steps:

(a) select any linkage system that closely approximates the given speed versus vane angle relationship and which gives the correct vane angle positions at the maximum and minimum stroke positions;
(b) plot the vane angle versus stroke position for this linkage and by using a linear speed/stroke relationship adjust the linkage until it approximates the vane schedule; and
(c) for a given stroke and vane angle position assign the correct engine speed and schedule the control as a function of the newly assigned angular position.

Other features and advantages will be apparent from the specification and claims and from the accompanying drawing which illustrates an embodiment of the invention.

DESCRIPTION OF THE PREFERRED EMBODIMENT

While this invention is described in its preferred embodiment where a four bar linkage system is utilized to interconnect the actuator and the variable vanes, it is to be understood that this invention can be employed utilizing other linkage systems. Details of the four bar linkage system are shown in U.S. Pat. No. 2,999,630, supra which is incorporated by reference herein.

Suffice it to say that the linkage system imparts rectilinear motion from the actuator and transduces it to rotary motion to the variable vanes for obtaining discrete angular positions thereof. As noted, in FIG. 1, a suitable actuator 22 shown schematically receives control signals (typically from the fuel control in a gas turbine installation) by feeding and bleeding hydraulic fluid into and out of the actuator in response to command signals. Such systems are well known in the art, as for example, the one shown in U.S. Pat. No. 3,977,300 granted to Robert Sherman on Aug. 31, 1976 and assigned to the same assignee as this application. By varying the lever arm length of the bell cranks, the rate of change of the angular position in each row of vanes can be made to vary. Thus, each succeeding row in the compressor stages will have a different angular movement rate to account for the changes in the aerodynamics of the system as the air flows from stage to stage. However, as can be expected, the amount of variation in the rate is solely dependent on the kinematics of the system.

Figure 1:
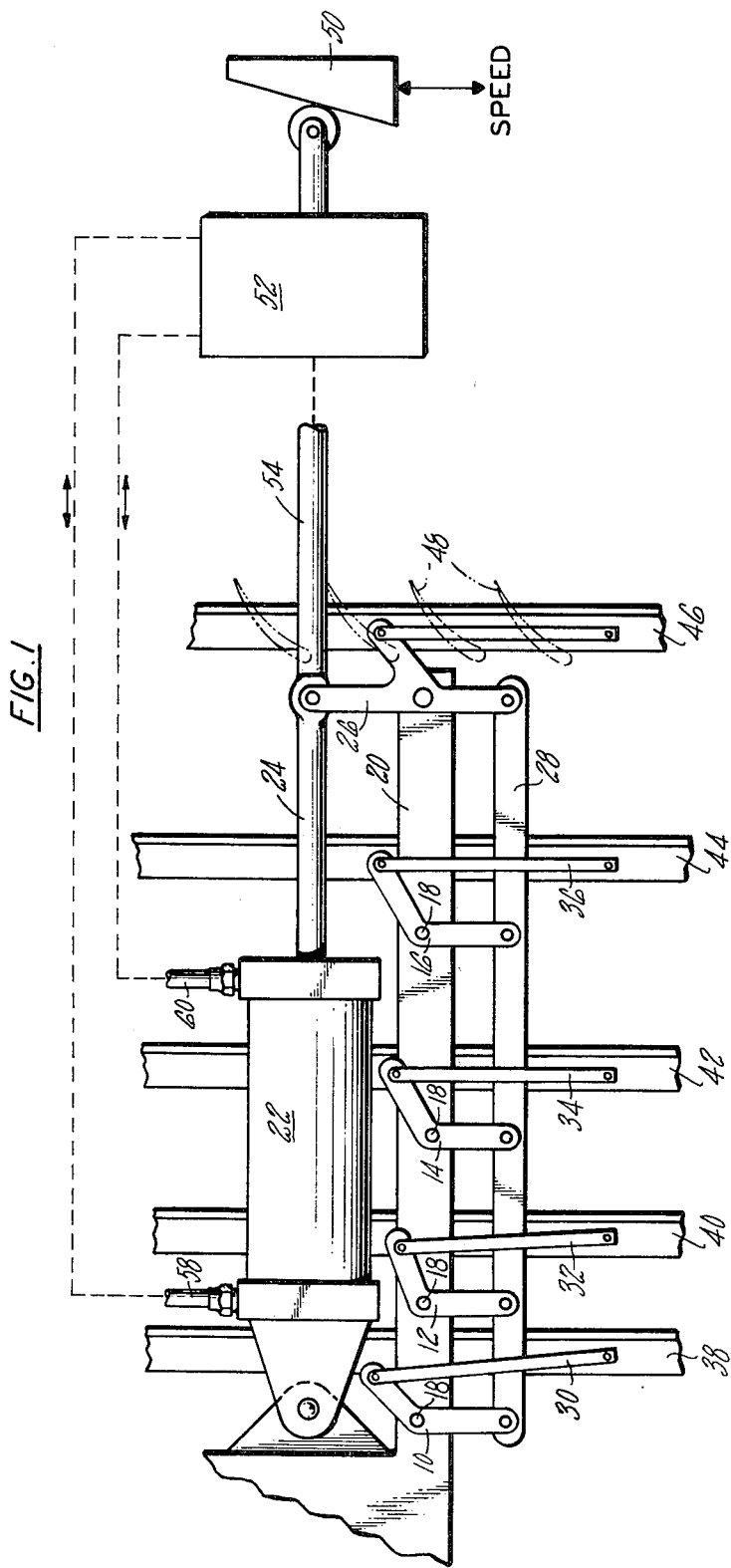
FIG. 1 is a view partly in elevation and partly in schematic illustrating the invention.

As shown in FIG. 1, a plurality of bell cranks 10, 12, 14 and 16 are pivotally connected at their respective pivot points 18 which is supported to fixed lever 20. Actuator 22, fixed at the most leftward end positions connecting rod 24 rectilinearly in response to the command signal fed thereto by, e.g., the engine's fuel control. Lever 26 connected at one end to connecting rod 24 and the other to the actuating lever 28 which, in turn is connected to the end of the respective bell cranks 10, 12, 14 and 16. The other ends of bell cranks 10, 12, 14 and 16 are connected to the rods 30, 32, 34 and 36 respectively for rotating the actuating rings 38, 40, 42 and 44 respectively. As illustrated schematically by the actuating ring 46, the variable vanes 48 (shown in phantom) are suitably rotated for the discrete angular movement.

As mentioned above, the rate of change of each row of vanes can only be manifested within the design limitations of the linkage system. To more clearly match a schedule that may be more conducive to the desirability for optimum aerodynamics, flutter free and good stall margins, the confines of the design offered by the linkage system may be inadequate.

According to this invention, cam 50 cooperating with the fuel control generally indicated by reference numeral 52 serves to reschedule the feedback lever 54 to modify the fuel control signal as applied to actuator 22 via feed and drain lines 58 and 60 which meters and ports hydraulic fluid as a function of the command signal which typically includes a parameter indicative of compressor speed. As will be apparent hereinbelow the cam 50 essentially modifies the speed signal so as to match the preascertained schedules.

Figure 2:
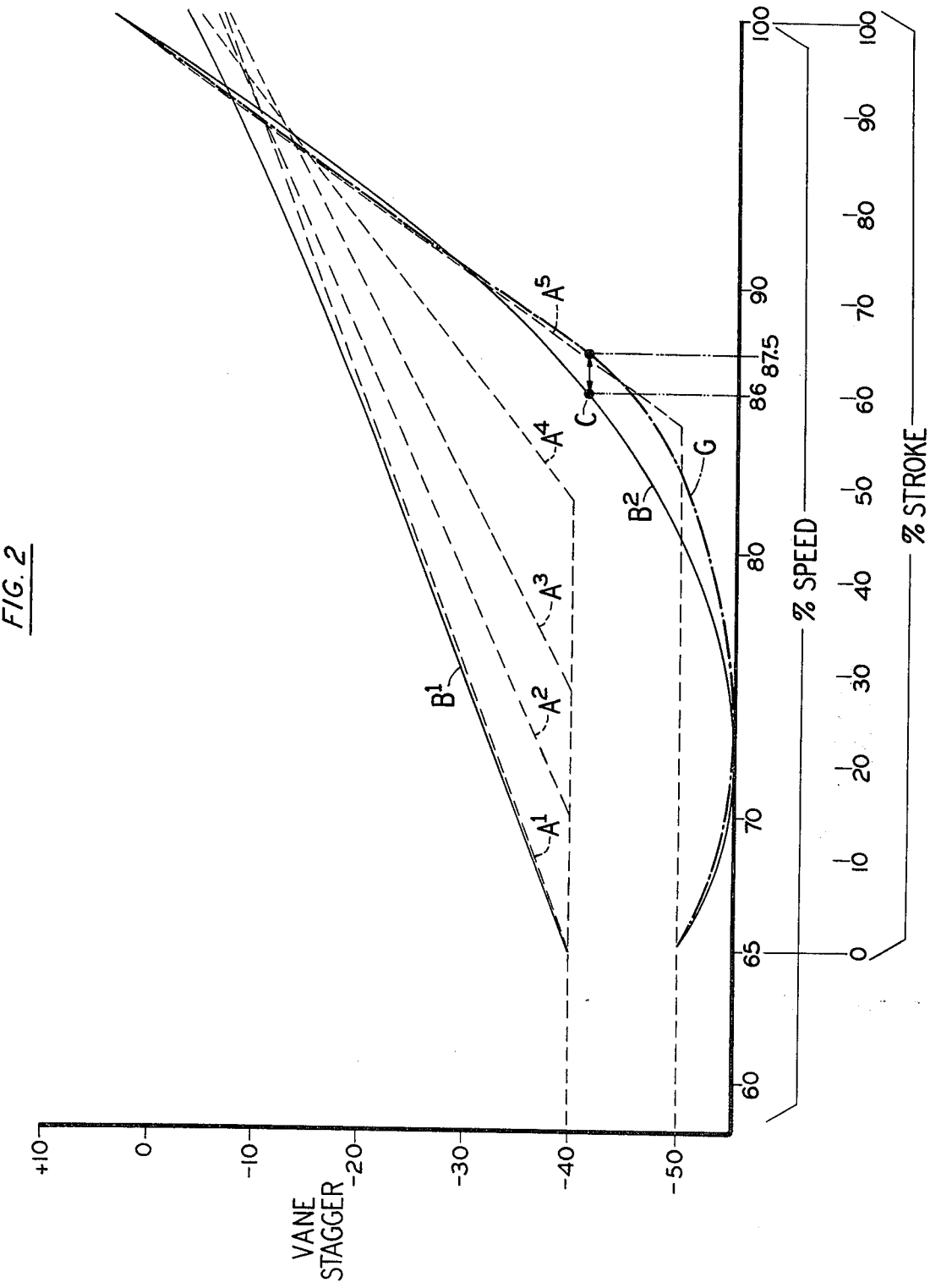
FIG. 2 is a graph plotting vane angular movement vs. compressor speed of the vanes and the means for matching the preascertained schedule.
Figure 3:
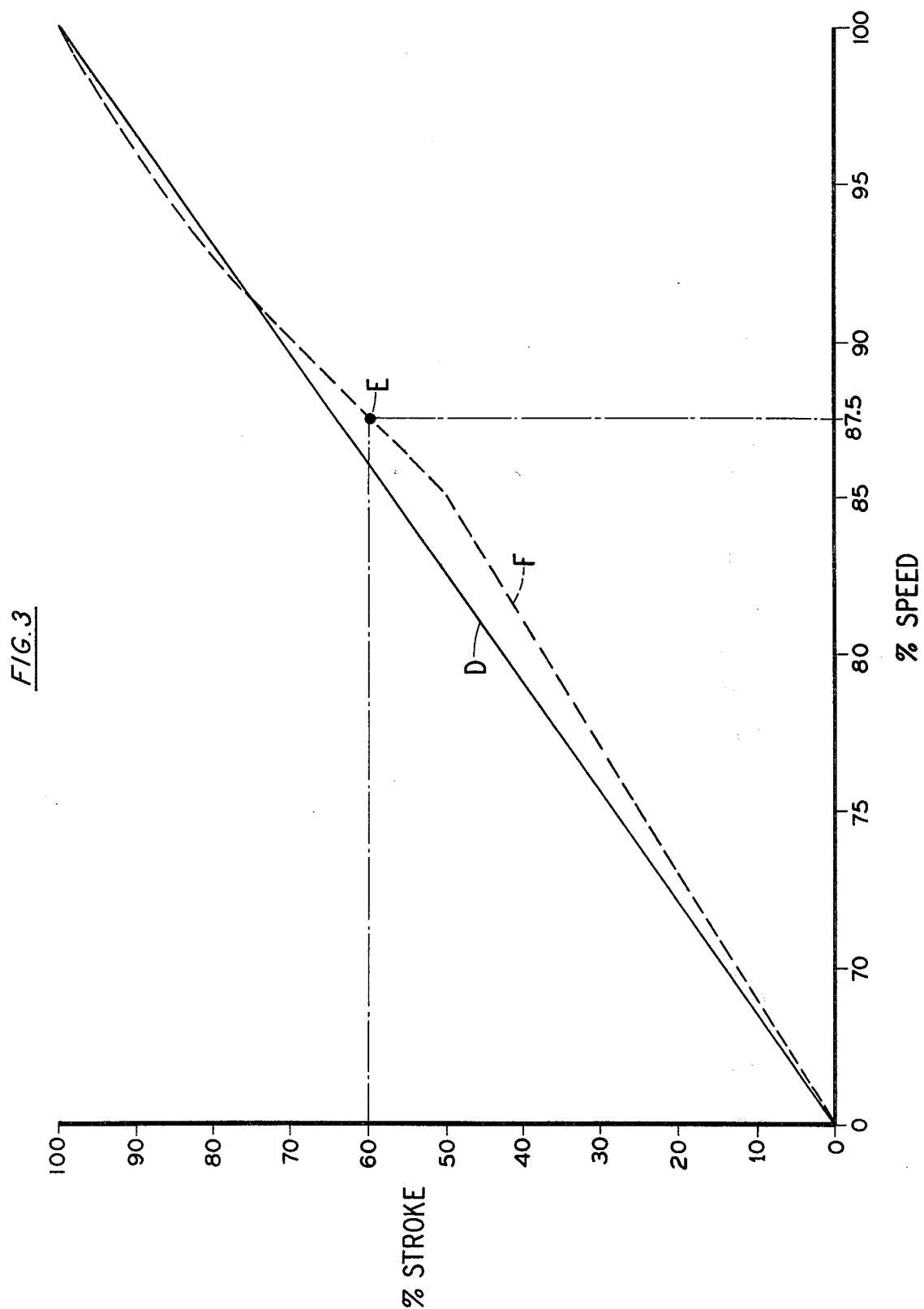
FIG. 3 is a graph plotting a function of stroke vs. compressor speeds illustrating the method of scheduling one of the rows of variable vanes.

The best way to understand the invention is by considering the graphs illustrated by FIGS. 2 and 3. As shown in FIG. 2, the dash lines $A^1$, $A^2$, $A^3$, $A^4$ and $A^5$ represent the schedule desired to achieve optimum vane positions. While these curves are shown as being linear, they can also be nonlinear. The solid lines $B^1$ and $B^2$ represent the actual schedule manifested by the linkage system (assuming its optimum design). The point C represents an arbitrary location on the curves showing the differential between the actual schedule and desired schedule and in this instance at the $-41°$ value (a vane stagger value) the speed is off 1.5% from 86 to 87.5.

Cam 50 can be contoured to adjust the speed signal from the fuel control to compensate for this difference. Selecting several points at will, the graph shown in FIG. 3 shows how to design the contour of the cam so as to achieve the matched schedule. In this instance, the solid line D is a replot of the $B^2$ curve of FIG. 2 in a plot of % stroke of that vane and % speed. Point E is the arbitrary point selected to show the discrepancy or difference between the actual and desired schedule. Several points, the numbers being arbitrary, are similarly plotted and the curve F (dash line) is faired to achieve a smooth transitional contour on this cam. The dot-dash line G represents the new schedule matching as close as possible to the desired schedule or at least minimizing the deviation.

The steps of matching a given speed versus vane angle relationship (curves $A^1$, $A^2$, $A^3$, $A^4$ and $A^5$) assuming the linkage is not capable of achieving this end is as follows:

(1) Select a linkage which best matches the given vane angle positions.

(2) Plot the vane angle versus stroke position for this linkage (FIG. 2, lines $B^1$ and $B^2$).

(3) Provide a linear stroke scale according to the extremes of the vane travel on the given vane schedules.

(4) Select a stroke position which will best adjust the curve closer to the given vane schedule curve.

(5) Keeping the vane stagger angle the same, read the speed from the given vane schedule curve.

(6) From the values obtained in steps 4 and 5 which is a point on the speed/stroke graph, plot on a second speed/stroke graph (FIG. 3) which includes the given speed/stroke relationship of the vane being scheduled.

(7) This point plotted in step 6 and two arbitrary points or end points (0% and 100% stroke) establish an approximate curve which essentially is a new stroke scale so that the adjusted actual IGV curve can be created which better matches the given vane angle curve.

It should be understood that the invention is not limited to the particular embodiments shown and described herein, but that various changes and modifications may be made without departing from the spirit and scope of this novel concept as defined by the following claims.

I claim:

1. Means for controlling the rate of change of a variable stator vane of a compressor section of a gas turbine engine where the linkage is not capable of meeting the schedule for said vane angle changes necessary to maximize the aerodynamics of the system, said means including an actuator, a linkage system interconnecting said actuator and said variable vanes, control means responsive to at least one engine operating parameter for controlling said actuator, and additional means responsive soley to compressor speed for further controlling said actuator, said additional means including a cam having a given profile for producing a signal which has a preascertained nonlinear speed relationship of a given stroke of said actuator for a given speed of said compressor and said additional means readjusting said control means in response to said signal to achieve a change in the rate of change schedule of said stator vanes to meet said schedule.

2. Means as claimed in claim 1 wherein said linkage includes a bell crank and a four bar linkage system interconnecting said actuator and said bell crank.

* * * * *